United States Patent Office 3,428,733
Patented Feb. 18, 1969

3,428,733
PREVENTION OF LITTERING IN ANIMALS WITH DEHYDROEPIANDROSTERONE 3 - (2'-TETRAHYDROPYRANYL)ETHER
George O. Allen, Jr., Somerville, N.J., assignor to Ortho Pharmaceutical Corporation, a corporation of New Jersey
No Drawing. Filed Dec. 22, 1966, Ser. No. 603,750
U.S. Cl. 424—241     3 Claims
Int. Cl. A61k 17/00

ABSTRACT OF THE DISCLOSURE

The feeding of dehydroepiandrosterone 3-(2'-tetrahydropyranyl)ether to pregnant animals will reduce the size of or prevent litters.

---

The synthesis of dehydroepiandrosterone 3-(2'-tetrahydropyranyl)ether was reported by Greenhalgh, Henbest and Jones, Journal of the Chemical Society, 1190 (1951), and Ott, Murray and Pederson, Journal of the American Chemical Society 74, 1239 (1952). In both instances, the compound was prepared as an intermediate for further synthetic studies.

Dehydroepiandrosterone 3-(2'-tetrahydropyranyl)ether has the structure:

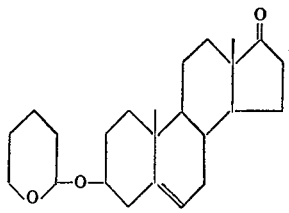

Dehydroepiandrosterone 3-(2'-tetrahydropyranyl)ether is not progestational, androgenic, anti-estrogenic or anti-progestational upon oral administration. Biological studies have shown the compound to be potent as an orally administered anti-fertility agent which exerts its action after fertilization and implantation have occurred. In the field of veterinary medicine, such an agent finds application in the breeding of domestic animals such as horses, cattle, swine and dogs, and in the control of the population of predatory animals such as coyotes, wolves and foxes.

Example I.—Preparation of dehydroepiandrosterone 3-(2'-tetrahydropyranyl)ether 61 grams of dehydroepiandrosterone is added to a solution of 425 ml. of dihydropyran (dried over calcium hydride and freshly distilled from sodium hydroxide) and 2.5 ml. of concentrated hydrochloric acid. The mixture is stirred at room temperature for two hours. The solution is allowed to stand at room temperature overnight and is then treated with a solution of 2% potassium hydroxide in methanol until neutral to indicator paper. 200 ml. of methanol is added and the solution is slowly diluted with water until crystals form. A large excess of water is then added, the mixture is cooled and the precipitate is collected. Upon recrystallization from methanol, three is obtained 64.5% g. (82% yield) of dehydroepiandrosterone 3-(2'-tetrahydropyranyl)ether melting at 172.5°–174°.

Example II 10 grams of dehydroepiandrosterone in 320 ml. of anhydrous ethyl ether and 41 ml. of dihydropyran (freshly distilled from sodium hydroxide) is treated with 4 drops of concentrated hydrochloric acid. The solution is allowed to stand at room temperature for seven days. Six sodium hydroxide pellets are added and the mixture is concentrated to dryness in vacuo. A white solid residue is obtained which upon crystallization from acetone yields 5.7 g. of dehydroepiandrosterone 3-(2'-tetrahydropyranyl)ether melting at 175°–180°.

Example III.—Biological activity

Twenty milligrams per kilogram of body weight per day of dehydroepiandrosterone - 2' - tetrahydropyranyl ether was given to seven rats with positive pregnancies in sesame oil by stomach tube on days 9-12 inclusive of the pregnancy. The rats were autopsied at the end of the normal rat gestation period and the uteri were observed for implants. Eighty-seven fetuses were resorbed from a total of 90 implant sites.

Example IV

Pregnant rats were dosed by intubation with dehydroepiandrosterone 3-(2'-tetrahydropyranyl)ether dissolved in 1 ml. of sesame oil for each dose. The following table sets forth the day or days of pregnancy on which the rats are dosed. On day 21 of the pregnancy, the rats are sacrificed, and the uterine contents are examined.

| | Day Dosed | Daily Dosage mg./Kg of body wt. | Number of Implants Resorbed/ total | Percent of Implants Resorbed |
|---|---|---|---|---|
| No. of Rats: | | | | |
| 2 | 9 | 40 | 8/22 | 36.2 |
| 3 | 10 | 20 | 23/40 | 57.5 |
| 10 | 10 | 40 | 78/129 | 60.5 |
| 5 | 10 | 80 | 60/63 | 95.4 |
| 5 | 11 | 40 | 26/52 | 50.0 |
| 5 | 12 | 40 | 36/64 | 56.4 |
| 3 | 9–10 | 20 | 18/31 | 58.0 |
| 2 | 9–10 | 40 | 18/18 | 100.0 |
| 7 | 10–11 | 20 | 49/72 | 68.0 |
| 3 | 10–11 | 40 | 28/29 | 96.0 |
| 4 | 11–12 | 20 | 26/38 | 68.4 |
| 5 | 11–12 | 40 | 54/59 | 91.5 |
| 4 | 9–12 | 10 | 33/42 | 78.6 |
| 10 | 9–12 | 20 | 116/120 | 96.7 |
| 11 | 9–12 | 40 | 129/129 | 100.0 |
| 5 | 1–8 | 40 | 53/53 | 100.0 |
| 8 | 13–20 | 40 | 26/91 | 28.6 |

The data in the foregoing table show that the compound is most effective when given during the second trimester of pregnancy or when the compound is present in the animal during the second trimester of pregnancy.

Example X

Dehydroepiandrosterone 3-(2'-tetrahydropyranyl)ether suspended in distilled water is administered subcutaneously to pregnant female rats on the day and in the dosage set forth in the following table. On day 21 of the pregnancy, the rats are sacrificed, and the uterine contents are examined.

| | Day Dosed | Daily Dosage, mg./kg. of body wt. | Number of Implants Resorbed/ total | Percent of Implants Resorbed |
|---|---|---|---|---|
| Number of Rats: | | | | |
| 8 | 8 | 40 | 63/77 | 81.8 |
| 5 | 10 | 40 | 39/49 | 79.6 |

For veterinary use, dehydroepiandrosterone )-(2'-tetrahydropyranyl)ether may either be given in the diet by stomach intubation or by subcutaneous injection to female animals where an undesired pregnancy in the animal is suspected.

In the field of predatory control, bait dosed with the compound can be left in known feeding areas of the predators.

What is claimed is:

1. A method of preventing littering in animals which comprises administering a litter preventing amount of dehydroepiandrosterone 3 - (2'-tetrahydropyranyl)ether to pregnant animals.

2. A method according to claim 1, wherein there is administered at least 20 mg. of dehydroepiandrosterone 3-(2'-tetrahydropyranyl)ether per kilogram of animal body weight per day.

3. A method according to claim 1, wherein said dehydroepiandrosterone 3 - (2'-tetrahydroepiandrosterone) 3-(2'-tetrahydropyranyl)ether is administered for from 1 to 4 days during the second trimester of pregnancy.

References Cited

Ott et al. J.A.C.S. 74, p. 1239–1241 (1952).

FRANK CACCIAPAGLIA, JR., *Primary Examiner.*

S. J. FRIEDMAN, *Assistant Examiner.*